Feb. 28, 1961 W. W. HOWLAND 2,973,316
PROCESS FOR PREVENTING CORROSION IN FERROUS SYSTEMS
Filed July 12, 1957
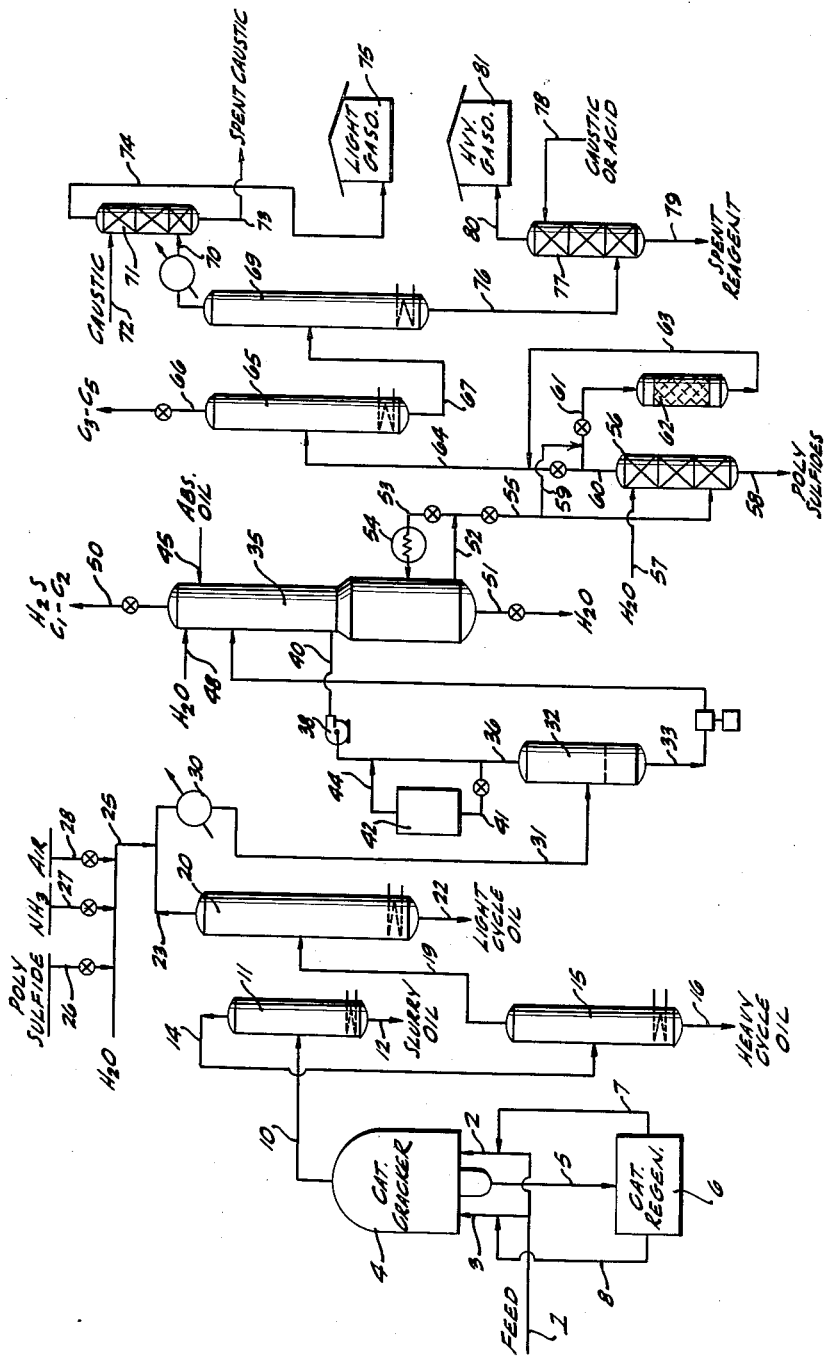
INVENTOR.
WARD W. HOWLAND,
BY
Lannas S. Henderson
AGENT.

United States Patent Office 2,973,316
Patented Feb. 28, 1961

2,973,316

PROCESS FOR PREVENTING CORROSION IN FERROUS SYSTEMS

Ward W. Howland, Anaheim, Calif., assignor to Union Oil Company of California, Los Angeles, Calif., a corporation of California Filed July 12, 1957, Ser. No. 671,487

10 Claims. (Cl. 208—228)

This invention relates to methods for fractionating and recovering cracked gasoline from the total products of cracking, whereby a sweet gasoline may be recovered with a minimum of processing, while at the same time avoiding corrosion of the fractionating equipment.

It has recently been observed that when hydrocarbon fractions are subjected to distillation in ferrous vessels in the presence of contaminating hydrogen sulfide and liquid water, a special type of corrosion occurs known as "hydrogen attack," or "hydrogen blistering." It is also known that this corrosion can be controlled by adding a small amount of an inorganic polysulfide to the hydrocarbon fraction being treated. The polysulfide acts as an inhibitor. However, the introduction of polysulfides into the system has now been found to lead to other problems. More specifically, the polysulfides tend to decompose into free sulfur and monosulfides or hydrosulfides, as e.g.:

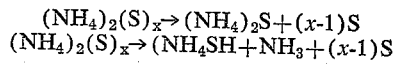

$$(NH_4)_2(S)_x \rightarrow (NH_4)_2S + (x-1)S$$
$$(NH_4)_2(S)_x \rightarrow (NH_4SH + NH_3 + (x-1)S$$

This decomposition may occur in the particular vessel to which the polysulfides are initially added to inhibit corrosion. Even more extensive decomposition has been found to occur in subsequent distillation columns operated at higher temperatures. The generation of free sulfur during the treatment of cracked gasolines leads to the synthesis of mercaptans, and it has been found that these mercaptans are of a character which cannot be removed by simple caustic washing. The present invention is directed specifically to methods for eliminating free sulfur and inorganic polysulfides from all parts of the fractionating system wherein the conditions are such that mercaptans can be formed from free sulfur and olefins, while at the same time using polysulfides to prevent hydrogen attack in those parts of the system subject thereto.

Briefly stated, the process of this invention comprises mixing inorganic polysulfide with the feed to a ferrous treating vessel in which it is desired to control hydrogen attack, and then after treatment of the hydrocarbon fraction therein but before said fraction is subjected to any subsequent treatment which is sufficiently severe to cause elemental sulfur to combine with olefins, substantially completely removing excess polysulfide and free sulfur. The polysulfides are preferably removed by simply water washing the hydrocarbon fraction. If free sulfur still remains in the product, this is then removed by treatment with lead mercaptide, lead oxide, sodium polysulfide, or any other reagent effective for combining with elemental sulfur. Following the removal of inorganic polysulfides and free sulfur, the gasoline fraction is then subjected to the final distillation steps, e.g. in depropanizer, debutanizer, depentanizer and rerun columns. These latter distillation columns are ordinarily operated at a sufficiently high temperature that no liquid water is present, and hence the problem of hydrogen attack is not present. Since these temperatures are also sufficient to cause elemental sulfur to combine with olefins to produce ultimately mercaptans, it is essential that inorganic polysulfides and free sulfur be removed prior to such treatments.

When these precautions are observed, it has been found that the final product may be readily sweetened by a simple caustic wash with e.g. a 10% water solution of sodium hydroxide. Where elemental sulfur or inorganic polysulfides are allowed to enter treating vessels or distillation columns operated at temperatures above about 325° F., the final product is found to contain mercaptans which cannot be removed by this treatment. Consequently, in those cases final sweetening can be obtained only by resorting to expensive treatments such as caustic-methanol washing, "solutizer" treatment (phenolic aqueous caustic), or alternatively the copper chloride sweetening system. All of these treatments are considerably more expensive than simple caustic washing with aqueous caustic.

From the foregoing it will be apparent that the principal object of this invention is to provide novel means for controlling the use of inorganic polysulfides as corrosion inhibitors, in such manner as to avoid any resulting problems arising from the presence of excess free sulfur and/or polysulfide. A more specific object is to avoid the synthesis of caustic-insoluble mercaptans during distillation of cracked gasolines at temperatures in excess of 325° F. The most comprehensive objective is to obtain the dual benefits of a corrosion-free fractionation system for cracked gasolines, while also producing a sweet product at minimum expense. Another object is to produce cracked gasolines which may be effectively sweetened by an inexpensive aqueous caustic wash. Other objects and advantages of the process will be apparent from the more detailed description which follows:

The hydrogen blistering phenomenon mentioned above is a well-recognized problem in many refineries. It is found to occur when a hydrocarbon fraction containing hydrogen sulfide is subjected to treatment in ferrous equipment in the presence of liquid water, and is accelerated by certain promoters such as cyanides. The precise mechanism is probably not completely understood, but is thought to involve first the reaction of hydrogen sulfide with the iron surfaces to generate iron sulfide and atomic hydrogen. Under certain conditions, the atomic hydrogen does not readily combine to produce molecular hydrogen, but instead diffuses into the interior of the metal walls of the vessel. This atomic hydrogen then tends to accumulate at minute imperfections in the metal structure, e.g. slag inclusions, crystal voids and the like. At these sites, the atomic hydrogen then combines to produce molecular hydrogen which cannot diffuse through the metal. The final result is that extremely high pressures are generated and blisters are formed on the walls of the vessel. These blisters may increase in size until a fissure develops permitting the escape of hydrogen, greatly weakening the strength of the metal wall, and leading to ultimate failure of the vessel.

It is known that this phenomenon can be controlled by adding a polysulfide such as ammonium polysulfide or sodium polysulfide to the hydrocarbon charge. The polysulfide acts as an inhibitor; apparently it reacts with the porous iron sulfide coating initially formed to produce a more complex coating which is impervious to further penetration by hydrogen sulfide. Substantially any inorganic polysulfide which is soluble in water may be employed, the preferred members being ammonium polysulfide and the alkali metal polysulfides, e.g. sodium polysulfide. In one modification, the polysulfide may be generated in situ by simply adding oxygen or air and an alkali, e.g. aqueous ammonia, or aqueous sodium hydroxide, to the hydrocarbon fraction. The added oxygen initially effects oxidation of hydrogen sulfide contained in the feed, and ammonium polysulfide is then formed, probably according to the following equations:

$$O_2 + 2H_2S \rightarrow 2H_2O + 2S \quad (1)$$
$$NH_3 + H_2S \rightarrow NH_4SH \quad (2)$$
$$NH_4SH + NH_3 \rightarrow (NH_4)_2S \quad (3)$$
$$(NH_4)_2S + xS \rightleftharpoons (NH_4)_2(S)_{x+1} \quad (4)$$

The amount of polysulfide to be employed is variable depending upon a number of factors, but in any event is used in very small quantities. In estimating the amount, it is important to take into account the amount of cyanide, as e.g. hydrogen cyanide or ammonium cyanide, which is present in the feed. Cyanides react with polysulfides to produce thiocyanates, as e.g.

$$(NH_4)_2(S)_2 + NH_4CN \rightarrow NH_4SCN + (NH_4)_2S \quad (5)$$

Consequently, at least sufficient polysulfide should be employed to neutralize any cyanide present. In addition to this quantity, a slight free excess should be maintained, generally amounting to between about 0.00001% and 0.01% by weight of the gasoline feedstock, although other proportions may be used.

Since Equation 4 above is reversible, and since more sulfur may be generated in Equation 1 than is converted to polysulfides, it is evident that an excess of free sulfur will always be present in the system. As above indicated, when the gasoline is subsequently subjected to distillation or other thermal treatment at temperatures in excess of about 325° F., the free sulfur will combine with reactive olefins to produce initially organic polysulfides, which then decompose to produce caustic-insoluble mercaptans. Any excess inorganic polysulfide which is present during such thermal treatment can further decompose to give free sulfur, which then reacts with the olefins in the same manner. Consequently, it is necessary to remove both the free sulfur and the excess inorganic polysulfide prior to any subsequent treatment of the gasoline at temperatures in excess of 325° F. At temperatures below this level, free sulfur appears to be almost wholly unreactive except where unusually reactive olefins are present, and may hence be tolerated.

To remove the excess polysulfides and sulfides, a simple water wash is prescribed. This may be effected countercurrently or batchwise as desired, and should be carried to the extent of reducing the inorganic sulfide and polysulfide level to below about 0.001% by weight, and preferably below about 0.0004%.

Following the removal of inorganic polysulfides, the hydrocarbon stream is then contacted with a reagent capable of combining with free sulfur. Suitable active agents include lead mercaptides, lead oxide, sodium polysulfide ($Na_2S_{1-2}$), and the like. Suitable mercaptides include for example the lead salts of the lower alkyl mercaptans, e.g. methyl mercaptan, ethyl mercaptan, isopropyl mercaptan, butyl mercaptan and the like. When mercaptides are used, the free sulfur reacts to produce lead sulfide and an organic disulfide:

$$Pb(RS)_2 + S \rightarrow PbS + RSSR$$

The organic disulfide which is produced may either be retained by adsorption in the bed, or it may dissolve in the hydrocarbon stream and pass on through the system. Organic disulfides are not detrimental inasmuch as they do not decompose to produce mercaptans as do the higher organic polysulfides. In a preferred modification, a bed of lead mercaptide is mixed with a major proportion of an adsorbent clay such as fullers earth, bauxite, bentonite and the like. The clay may comprise between about 40% and 90% by weight of the bed, and will act as an adsorbent for the organic disulfides formed.

Where lead oxide is employed certain additional advantages are obtained, in that lead oxide will combine with any mercaptans present to produce lead mercaptides which will then in turn react with the free sulfur. The desired mercaptide is in effect generated in situ. However, in using this modification it is necessary to insure that at least some lead mercaptide is initially present, otherwise the free sulfur will not be initially removed until sufficient lead mercaptide has been formed. In this case also it is preferable to use mixtures of clay and lead oxide similar to those above described.

If sodium polysulfide is used, the free sulfur reacts to produce a higher polysulfide, and no organic disulfides are generated. The sodium polysulfide is preferably employed in the form of a 2% to 20% water solution.

In the case of lead oxide or lead mercaptide, these beds become exhausted when the lead is substantially all converted to lead sulfide. When this point is reached, the bed may be simply discarded or it may be regenerated by known treatments, as by oxidation to produce lead oxide, and reused.

In any of the foregoing treatments for removing free sulfur, it is desired to reduce the free sulfur content of the feed to below about 0.001%, preferably below about 0.0004%. These levels insure that any mercaptans subsequently generated will be insufficient to exceed the doctor sweet level.

It may be observed that all of the foregoing difficulties as to corrosion, free sulfur removal and polysulfide removal could be avoided if the gasoline stock were initially subjected to a caustic scrubbing treatment to remove hydrogen sulfide. However, this alternative has been found to be impractical in most cases because the hydrogen sulfide level is usually so high that enormous quantities of caustic would be expended. This difficulty however might not accrue where the gasoline was derived from a low-sulfur, cracking stock. Specifically, where gasolines are produced containing less than about 0.05% by weight of hydrogen sulfide, it might conceivably be preferable to wash out all hydrogen sulfide. The present invention must hence be considered as primarily useful in connection with the treatment of unstabilized cracked gasolines containing in excess of 0.05% of hydrogen sulfide. Generally, the proportion is much higher; where initial cracking feedstocks containing 2% to 3% of sulfur are employed, the gasoline produced will, prior to stabilization, normally contain at least about 0.5% by weight of hydrogen sulfide. In these cases it is economically impractical to scrub out hydrogen sulfide; it is preferable to use the corrosion-inhibition system of this invention and remove the bulk of hydrogen sulfide in the light gases separated during stabilization.

The invention may perhaps be more readily understood with reference to the accompanying drawing which is a flow sheet illustrating one particular modification.

The initial feedstock, consisting for example of a light or heavy gas oil containing e.g. 0.5% to 3.0% sulfur, is brought in through line 1 and transferred via lines 2 and 3 to a conventional fluid catalytic cracker 4, operated at temperatures of e.g. 850–950° F. Spent catalyst is continuously removed via line 5, regenerated at 6, and recycled via lines 7 and 8 to form a suspension with the incoming feed in lines 2 and 3. This fluid catalytic cracking operation is conventional, and hence need not be described in detail. Instead of a catalytic cracking unit, any type of conventional thermal cracking unit may be substituted.

The total products of cracking are taken off through line 10 and transferred to a fractionating column 11 wherein a heavy slurry oil containing catalyst fines is recovered as bottoms in line 12 and the total overhead is transferred via line 14 to a second distillation column 15. Column 15 is operated to fractionate out a heavy cycle oil removed via line 16, and the total overhead, still containing all the gasoline and light gases, is transferred via line 19 to a third fractionator 20. In fractionation column 20, a light cycle oil boiling between about 450° and 650° F. is taken off in line 22, and the gasoline and lighter fractions boiling below about 450° F. are taken overhead via line 23. Columns 11, 15 and 20 are each operated at pot temperatures in excess of about 400° F. Hence no liquid water is present in these columns and there is no problem of corrosion. Also, the fact that the total overhead product in line 23 may be sweetened by dilute caustic washing shows that there was substantially no free sulfur in the total cracking products in line 10, because if such free sulfur had been present the temperatures in columns 11, 15 and 20 would have caused the synthesis of caustic-insoluble mercaptans.

The next step in the production of stabilized gasoline generally involves the separation of fixed gases, e.g. methane, ethane, ammonia, hydrogen sulfide, and the like. This operation cannot be economically carried out in the absence of liquid water. Some water is always present in the cracking products, and under the conditions normally employed in condensers, accumulators, and demethanizer and de-ethanizer columns, this water will be present in the liquid phase. Consequently it is at these points that problems of hydrogen attack generally arise. It is therefore necessary to add the polysulfide inhibitor prior to any sufficient reduction in temperature, or increase in pressure which will produce liquid water. As illustrated herein, the inhibitor is added to the overhead in line 23 as a water solution from line 25. If preformed polysulfide is employed it may be metered into line 25 via line 26. If ammonia and air are employed, so as to generate polysulfide in situ, these materials are suitably metered into line 25 via lines 27 and 28. It is preferable to employ the air-ammonia system for the reason that, oxygen being a gaseous oxidizing agent, it will remain present both in the liquid and gas phases of subsequent treating vessels and thus tends to give better over-all protection against hydrogen attack than does a preformed polysulfide, which is normally present only in the liquid phase.

Following the addition of inhibitor through line 25, the stabilized gasoline is condensed in exchanger 30 and transferred via line 31 to an accumulator 32.

The liquid phase of accumulator 32 is continuously withdrawn via line 33 and pumped via line 34 into the upper section of fractionating column 35, which may be either a demethanizer or a de-ethanizer. In either case, column 35 is operated at a pot temperature between about 150° and 325° F., and a pressure between about 0 and 300 p.s.i.g., the particular pressure-temperature combination used being such as to produce a liquid water phase in the column.

The gas phase from accumulator 32 is taken off via line 36, pressured up to the column 35 pressure by means of compressor 38, and introduced into column 35 via line 40 at a point below the liquid inlet line 34. As one alternative, a part or all of the gas phase in line 36 may be diverted through line 41 and passed through a conventional hydrogen sulfide removal unit 42, and then passed to column 35 via lines 44 and 40. This alternative reduces the hydrogen sulfide load in column 35 and increases the efficiency for removing H₂S.

In column 35 the liquid phase introduced via line 34 descends countercurrently to the rising gas stream from line 40. The descending liquid phase scrubs out heavy hydrocarbons from the gas phase, while the gas phase tends to strip fixed gases from the liquid phase. This countercurrent scrubbing operation is generally supplemented by introducing an absorber oil into the column via line 45 at a point above liquid inlet line 34. This absorber oil may comprise for example light cycle oil or heavy gasoline derived as hereinafter described. Also, it is preferable to introduce near the top of column 45 an additional stream of water via line 48. This water stream insures a sufficient liquid water phase to dissolve the inorganic polysulfides and distribute them over the interior surface of the column.

The light gases, comprising hydrogen sulfide, methane, ethane and the like, are removed overhead via line 50. This stream is then sent to conventional purification units, or burned as fuel gases as may be desired. The aqueous phase descending in column 35 collects in the bottom and is withdrawn via line 51. This aqueous phase contains dissolved ammonia, inorganic polysulfides and thiocyanates. Ordinarily this stream is regenerated by steam stripping and recycled via line 48, but it may be discarded if desired.

The partly stabilized gasoline accumulates in the bottom of column 35, and is continuously withdrawn via line 52, and a portion thereof is diverted via line 53 for recycle to the column via reboiler 54. The net bottoms product is then withdrawn via line 55 and passed into the bottom of water washing column 56 wherein it is passed countercurrently to a descending water stream introduced via line 57. If desired a small amount of ammonia may be added to the water stream in line 57 in order to assist in the removal of hydrogen sulfide. The foul water removed via line 58 may be discarded, or may be used as recycle after partial regeneration, or may be in part introduced into column 35 via line 48, or may be concentrated and used as inhibitor introduced through line 25.

The hydrocarbon stream from column 56 is removed via line 60, and if free sulfur is present, it is transferred via line 61 to treating column 62, which consists of a dry bed of lead oxide, or lead merceptide, or aqueous sodium polysulfide, as previously described. In cases where the gasoline from column 35 contains little or no excess polysulfide, the treatment in column 56 may be omitted, the product in line 55 being diverted directly to column 62 via lines 59 and 61. In column 62 substantially all of the free sulfur is removed as above described, and the effluent is removed via line 63 and passed via line 64 to depentanizer column 65, which is ordinarily operated at pot temperatuers in excess of 325° F.

Column 65 is operated so as to fractionate overhead via line 66 light hydrocarbons comprising mainly propane, butane and pentane, and a small amount of hydrogen sulfide. Since no liquid water is present in column 65 there is no problem of hydrogen attack. Stabilized gasoline is withdrawn as bottoms from column 65 via line 67, and is transferred to a rerun column 69, which is optional, but is generally used to split the gasoline into a light fraction and a heavy naphtha. The light fraction generally has a boiling range of about 100° to 350° F., whereas the heavy naphtha has a usual boiling range of about 300° to 450° F.

Light gasoline is removed overhead from column 69 via line 70 and is introduced into the lower section of caustic wash column 71 wherein it contacts countercurrently dilute aqueous caustic solution introduced via line 72. This caustic solution may consist for example of 1%–20% by weight of sodium hydroxide, or other alkali metal hydroxide, dissolved in water. It is found that by simple washing with dilute caustic, the gasoline from column 69 can be rendered completely sweet to the doctor test. Spent caustic is withdrawn from column 71 via line 73 and is either discarded or regenerated by conventional procedures, as e.g. by steam stripping to recover mercaptans and regenerate sodium hydroxide. The sweetened gasoline stream is withdrawn via line 74 and sent to storage at 75.

The heavy naphtha from column 69 is transferred via line 76 to a second scrubbing column 77 for final sweetening. The sweetening in column 77 may be of a similar character as that in 71, employing the same type of caustic wash. The aqueous caustic is added via line 78, and spent caustic is withdrawn for discard or regeneration through line 79. The doctor sweet naphtha is withdrawn via lnie 80 and sent to storage 81.

The heavy fractions of cracked gasoline are generally less stable than the light fractions. This is probably due to the presence of larger amounts of nitrogen bases and/or diolefins. Consequently, it may be desirable to use an acid treatment instead of the caustic wash for the heavy naphtha. For this purpose, concentrated sulfuric acid is used to give improved gum-stability, and to effect total sulfur and nitrogen removal.

Obviously the details of the above-described processing scheme may be varied considerably within the scope of the present invention. The fractionating sequence described is merely one of many which are conventionally employed, and it is not intended to exclude other fractionating systems embodying the essential elements of a stabilizer column operating at temperatures wherein liquid water is present, followed by fractionating columns operated at pot temperatures in excess of 325° F.

Certain critical aspects of the invention will be more apparent from the following examples which are not however to be construed as limiting in scope.

*Examples*

In a commercial fluid catalytic cracking unit and recovery system similar to that illustrated in the drawing, wherein air and ammonia were being introduced via line 25 to control corrosion in accumulator 32 and deethanizer column 35, but wherein polysulfide and sulfur-removing units 56 and 62 were omitted, it was observed that the final light and heavy gasolines were doctor-sour, and could not be sweetened by washing with 10% aqueous caustic solution.

Samples of the intermediate gasoline were withdrawn from line 23 just prior to the addition of air (sample 1), from accumulator 32 (sample 2), and from line 55 (sample 3), following the de-ethanizer. A portion of sample No. 1 was subjected to caustic washing with 10% aqueous sodium hydroxide. The product was then found to be sweet to the doctor test. Analysis showed the original sample to contain less than 0.00005% of elemental sulfur. Upon distillation of another portion of the sample into 5% distillate cuts at pot temperatures ranging from about 100° to 450° F., it was found that all cuts could still be rendered doctor sweet by 10% aqueous caustic washing.

Sample No. 2 was found by analysis to contain 0.031 weight-percent of elemental sulfur, and 0.0005 weight-percent of mercaptan sulfur. Upon distillation of a portion of this sample into a $C_5$—330° F. light fraction, and a 330°–450° F. heavy fraction, both fractions were found to be doctor sour. The light fraction contained 0.0040 weight-percent mercaptan sulfur, and the heavy fraction contained 0.0054 weight-percent. Neither fraction could be sweetened by washing with 10% aqueous caustic; the mercaptan sulfur contents after caustic washing being about 0.003 weight-percent for the light fraction and about 0.0018 percent for the heavy fraction.

Another portion of sample No. 2 was percolated through a bed of lead mercaptide, after which the elemental sulfur content was found to be 0.00006 weight-percent, or nil within the limits of analytical accuracy. Upon distillation of the treated portion into light and heavy fractions as above, it was found that the products were initially sour, but both fractions could readily be sweetened by washing with 10% aqueous caustic (mercaptan sulfur less than 0.0003%).

Sample No. 3 was found to contain more elemental sulfur than sample No. 2, as well as suspended, water-soluble polysulfides. Upon water washing this sample the polysulfide content was reduced to practically nil, and upon percolating the washed effluent through a bed of lead mercaptide, both elemental sulfur and polysulfide sulfur were nil. The treated product could be sweetened by 10% aqueous caustic washing, either before or after distillation at pot temperatures ranging up to 450° F.

It is evident from the foregoing that generation of free sulfur following the addition of air, and the subsequent treatment of the gasoline at temperatures in excess of 325° F., results in the synthesis of difficultly removable mercaptans. It is also evident that this problem can be very cheaply and easily controlled by the methods herein described.

It is not intended that the invention should be limited to the exemplary details described herein; the true scope of the invention is intended to be embraced by the following claims.

I claim:

1. In a fractionation system for recovering cracked gasoline from the total products of cracking, said fractionation system including a ferrous treating vessel normally subject to corrosion by hydrogen attack wherein said gasoline is treated in the presence of hydrogen sulfide and liquid water, and wherein subsequent fractionation steps are performed at a temperature above about 325° F., the improved method for preventing hydrogen attack on said ferrous vessel while at the same time avoiding the formation of mercaptans during said subsequent fractionation, which comprises adding sufficient of an inorganic polysulfide to said gasoline prior to treatment in said ferrous vessel to provide a free excess thereof of between about 0.00001% and 0.01% by weight, and after treatment in said ferrous vessel but prior to any subsequent treatment at a temperature above about 325° F., substantially completely removing elemental sulfur and inorganic polysulfide from said gasoline, said removal of elemental sulfur being effected by contacting said gasoline with a reagent selected from the group consisting of lead mercaptide, lead oxide, and sodium polysulfide.

2. A process as defined in claim 1 wherein said polysulfide is generated in situ by the addition of air and ammonia to said gasoline prior to the treatment in said ferrous vessel.

3. A process as defined in claim 1 wherein said removal of inorganic polysulfide is effected by water washing.

4. A process as defined in claim 1 wherein said gasoline, after said treatment at above 325° F., is subjected to caustic washing with a dilute water solution of sodium hydroxide to recover therefrom a doctor-sweet product.

5. A process for recovering a sweet cracked gasoline from the total products of catalytic cracking, said total products including at least about 0.05% by weight of hydrogen sulfide, which comprises first subjecting said total products to primary fractionation in the absence of free sulfur and liquid water to separate a light fraction boiling below about 450° F., adding to said light fraction a small proportion of an inorganic polysulfide sufficient to provide a free excess thereof of between about 0.00001% and 0.01% by weight, subjecting said light fraction to secondary fractionation to separate light gases in a ferrous column at a pot temperature of between about 150° and 325° F. in the presence of liquid water, said ferrous column being normally subject to corrosion by hydrogen attack under the stated fractionation conditions subjecting the still botttoms from said secondary fractionation to treatment for removal of inorganic polysulfides and free sulfur, thereafter subjecting the purified residue to tertiary fractionation in the absence of liquid water at a pot temperature in excess of about 325° F. to remove undesired light fractions, and to recover a final gasoline fraction in the desired boiling range, and subjecting said final gasoline to caustic washing with a dilute water solution of sodium hydroxide, and recovering from said caustic washing a sweetened cracked gasoline, said removal of free sulfur being effected by contacting said still bottoms with a reagent selected from the group consisting of lead mercaptide, lead oxide and sodium polysulfide.

6. A process as defined in claim 5 wherein said primary fractionation is conducted at a pot temperature above 400° F.

7. A process as defined in claim 5 wherein said polysulfide is generated in situ by the addition of air and ammonia to said light fraction.

8. A process as defined in claim 5 wherein said removal of inorganic polysulfide is effected by water washing.

9. In a process wherein a cracked gasoline is subjected to a distillation temperature in excess of about 325° F., and the effluent therefrom is subjected to a sweetening treatment, said cracked gasoline initially containing (1) a substantial amount of free sulfur, and (2) a substantial proportion of mercaptans soluble in 10% aqueous caustic solution, but substantially no mercaptans insoluble in said caustic solution, the improvement which comprises treating said gasoline prior to the time it is subjected to said distillation temperature to remove said free sulfur, and sweetening the effluent from said distillation by scrubbing with a dilute water solution of sodium hydroxide, said removal of free sulfur being effected by treating said gasoline with a reagent selected from the group consisting of lead mercaptide, lead oxide and sodium polysulfide.

10. In a process wherein a cracked gasoline initially containing more than about 0.0004% by weight of free sulfur is subjected to heating at a temperature in excess to about 325° F. whereby mercaptans are normally synthesized by the reaction of said free sulfur with olefins, the improvement which comprises reducing said mercaptan synthesis by treating said gasoline with a reagent to chemically combine with and reduce the free sulfur content thereof to below about 0.0004% prior to said heating, said reagent being selected from the group consisting of lead mercaptide, lead oxide, and sodium polysulfide.

References Cited in the file of this patent

UNITED STATES PATENTS

| | | |
|---|---|---|
| 1,789,335 | Fischer et al. | Jan. 20, 1931 |
| 2,020,661 | Schulze et al. | Nov. 12, 1933 |
| 2,780,583 | Skei et al. | Feb. 5, 1957 |

OTHER REFERENCES

Kalichevsky et al.: "Petroleum Refining with Chemicals," page 142, Elsevier Pub. Co., New York, 1956.